(12) United States Patent
Mayer

(10) Patent No.: US 7,114,466 B1
(45) Date of Patent: Oct. 3, 2006

(54) ANIMAL CONTROL DEVICE

(76) Inventor: Richard E. Mayer, 22 Theodore La., Norwalk, CT (US) 06851

( * ) Notice: Subject to any disclaimer, the term of this patent is extended or adjusted under 35 U.S.C. 154(b) by 203 days.

(21) Appl. No.: 10/947,110

(22) Filed: Sep. 23, 2004

(51) Int. Cl.
*A01K 15/04* (2006.01)

(52) U.S. Cl. ............ 119/720; 119/721; 340/573.3

(58) Field of Classification Search ............ 119/720, 119/719, 721, 712, 908, 905; 340/573.1, 340/573.2, 573.3
See application file for complete search history.

(56) References Cited

U.S. PATENT DOCUMENTS

| | | | | |
|---|---|---|---|---|
| 3,161,974 A | * | 12/1964 | Blockson | 40/544 |
| 3,317,722 A | * | 5/1967 | Whitney | 313/512 |
| 5,013,967 A | * | 5/1991 | Hirotaka et al. | 313/512 |
| 5,575,242 A | | 11/1996 | Davis et al. | |
| 5,775,016 A | * | 7/1998 | Chien | 40/544 |
| 5,799,618 A | * | 9/1998 | Van Curen et al. | 119/721 |
| 6,151,276 A | | 11/2000 | Peinetti | |
| 6,158,392 A | | 12/2000 | Andre et al. | |
| 6,527,401 B1 | * | 3/2003 | Chu | 362/84 |
| 6,561,137 B1 | * | 5/2003 | Oakman | 119/721 |
| 6,717,360 B1 | * | 4/2004 | Chu | 313/511 |
| 7,021,244 B1 | * | 4/2006 | Boyd | 119/721 |

* cited by examiner

*Primary Examiner*—Yvonne R. Abbott
(74) *Attorney, Agent, or Firm*—Crossley Patent Law; Mark A. Crossley

(57) ABSTRACT

An animal control device for prohibiting animal access to or egress from a desired area. The transmitter comprises a flexible transmitter strip and strip extensions that are designed to be physically unobtrusive. The strip further comprises on/off switch, frequency control, AC power plug and a battery backup. The receiver and emission component of the device comprises a removable and adjustable animal collar, or plurality of animal collars which emit audible sound, ultrasound, vibration, or mild electric shock.

16 Claims, 4 Drawing Sheets

ANIMAL CONTROL DEVICE

BACKGROUND OF THE INVENTION

1. Field of the Invention

This invention relates to animal control devices and more specifically to a device for restraining an animal from entering or exiting an area.

2. Description of the Prior Art

Animal control devices are not new in the prior art. By way of example:

U.S. Pat. No. 5,575,242 to Davis et al. discloses an animal constraint device.

U.S. Pat. No. 6,148,392 to Andre et al. discloses a device for preventing an animal from crossing a zone.

U.S. Pat. No. 6,151,276 to Peinetti discloses an echo-ranging boundary system for animals.

While the above-described devices fulfill their respective and particular objects and requirements, they do not describe an animal control device that provides for the advantages of the present invention. Therefore, a need exists for an improved animal control device. In this respect, the present invention substantially departs from the conventional concepts and designs of the prior art.

SUMMARY OF THE INVENTION

In view of the foregoing disadvantages inherent in the known types of animal control devices now present in the prior art, the new animal control device overcomes the above-mentioned disadvantages and drawbacks or the prior art. As such, the general purpose of the animal control device, described subsequently in greater detail, is to provide an animal control device which has all of the advantages of the prior art mentioned heretofore and many novel features that result in an improved animal control device which is not anticipated, rendered obvious, suggested, or even implied by the prior art, either alone or in combination thereof.

To accomplish this, the present animal control device comprises a transmission strip and a receiver and emission collar unit for attaching to animals. The device is used for one animal or even several animals simultaneously. Additional collars are available for simultaneous, multiple animal usage. The transmission strip is comprised of transmission wires embedded within a flexible rubber strip of thin and substantially flat profile, with preferably slightly rounded outer edges. The strip is thin so that it is not likely to cause tripping and also so that it may be placed underneath a rug, carpet, or cushions or the like and not be visually intrusive.

Further, the strip is component extendable and flexible so that it can be arranged to accommodate either large or small areas and also be formed into various gentle curves. Strips plug into each other for extension of the animal control device, with an end cap for terminating the strip at the desired length. Plug design is basic with a male/female construction. Preferably, the first strip, with incorporated controls, is equipped with the female plug disposed at the end opposite the controls, with additional strips featuring male and female ends, and the end cap therefore being male. Another embodiment reverses that male female relationship, as shown in the following FIGS. 1–5. Controls for on/off operation and for transmission frequency are conveniently mounted on the strip.

The collar receiver/emitter resembles a typical collar with the addition of a small receiver/emitter. The receiver/emitter is a thin hexahedron with rounded corners and edges. The emitter projects a warning to the animal. Warnings are either audible to human ears or ultrasonic. Additional embodiments of the receiver/emitter replace the sound chip with mechanisms for delivering warnings in the form of mild electrical shock or vibration. The collar is fitted to the animal needing control. The transmitter strip is placed where a boundary is to be established, one which is not to be crossed. The transmitter is then plugged in and turned on and adjusted by the frequency control. An animal proximal to the strip is thereby discouraged from crossing that boundary.

The transmitter strip houses a battery backup to allow for conditions when standard AC current is not provided or convenient. An internal modulator automatically switches between battery or AC current power. The animal control device is basic, durable, inexpensively produced and portable.

Thus has been broadly outlined the more important features of the animal control device so that the detailed description thereof that follows may be better understood and in order that the present contribution to the art may be better appreciated. Numerous objects, features and advantages of the animal control device will be readily apparent to those of ordinary skill in the art upon reading the following detailed description of presently preferred, but nonetheless illustrative, embodiments of the animal control device when taken in conjunction with the accompanying drawings. In this respect, before explaining the current embodiments of the animal control device in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the animal control device. It is therefore important that the claims be regarded as including such equivalent constructions insofar as they do not depart from the spirit and scope of the present invention.

A primary object, then, of animal control device is to control animal access to or from desired areas.

Another object of the animal control device is to provide for flexibly shaped and desired length installations.

It is an additional object of the animal control device to provide control for several animals with one transmitter strip.

Yet another object of the animal control device is to provide for battery backup power.

These together with additional objects of the animal control device, along with various novel features that characterize the invention are particularly pointed out in the claims forming a part of this disclosure. For better understanding of the animal control device, its operating advantages and specific objects attained by its uses, refer to the accompanying drawings and description.

BRIEF DESCRIPTION OF THE PREFERRED EMBODIMENT

DETAILED DESCRIPTION OF THE PREFERRED EMBODIMENT

Figure 1:
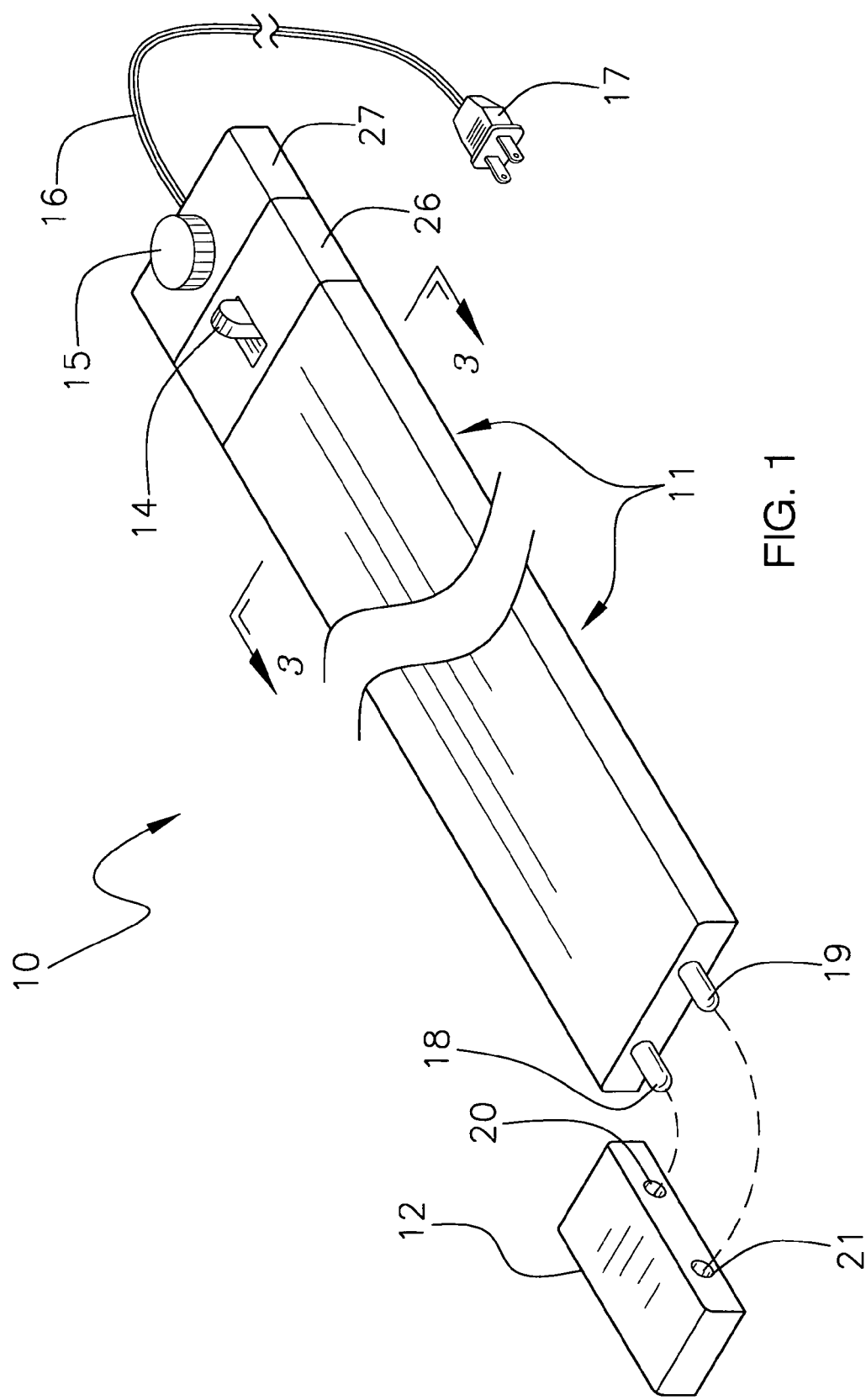
FIG. 1 is a perspective view of the transmitter strip of the animal control device.
Figure 2:
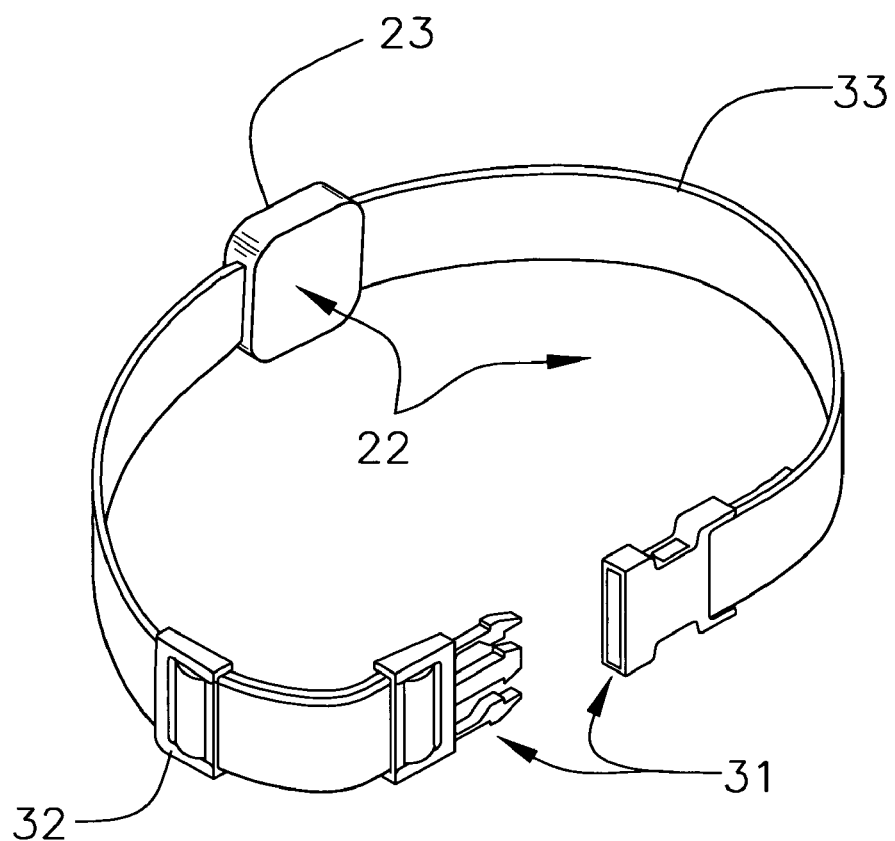
FIG. 2 is a perspective view of the animal collar with receiver/emitter.

With reference now to the drawings, and in particular FIGS. 1 through 5 thereof, the preferred embodiment of the animal control device employing the principles and concepts of the present invention and generally designated by the reference number 10 will be described. Referring FIGS. 1 and 2, the animal control device 10 comprises transmitter strip 11 and collar unit 22. Strip 11 (FIG. 1) is about 48 inches long and a substantially parallelepiped flexible strip. Strip 11 further comprises, at distal end, end cap 12. The shape of end cap 12 matches and fits to strip 11 by way of female receptacle 20 and female receptacle 21. End cap 12 plugs onto distal end of strip 11 by way of male extension plug 18, which fits into receptacle 20 of cap 12, and male extension plug 19, which fits into receptacle 21 of cap 12. Cap 12 thereby securely and safely terminates transmitter wire 34 and transmitter wire 35 (FIG. 3) within plugs 18 and 19. Cap 12 contains a loop (not shown) for transmitter wires 34 and 35.

Strip 11 further comprises, at proximal end, switch/battery housing 26, also identically shaped to the remainder of strip 11. Frequency control housing 27, also of matching shaped comprises the distal end of strip 11. On/off switch 14 is disposed upwardly within housing 26. Housing 26 further houses back up battery (not shown) for utilizing invention 10 without standard outlet AC power (not shown). Electrical cord 16 provides power via AC plug 17 when standard outlet power is utilized. Round knob frequency control 15, oriented vertically within housing 27, provides for adjustment of transmitter strip 11 signal strength.

Figure 3:
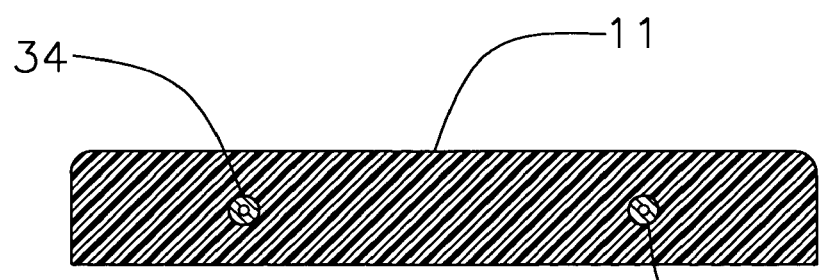
FIG. 3 is a cross-sectional view of the transmitter strip.
Figure 4:
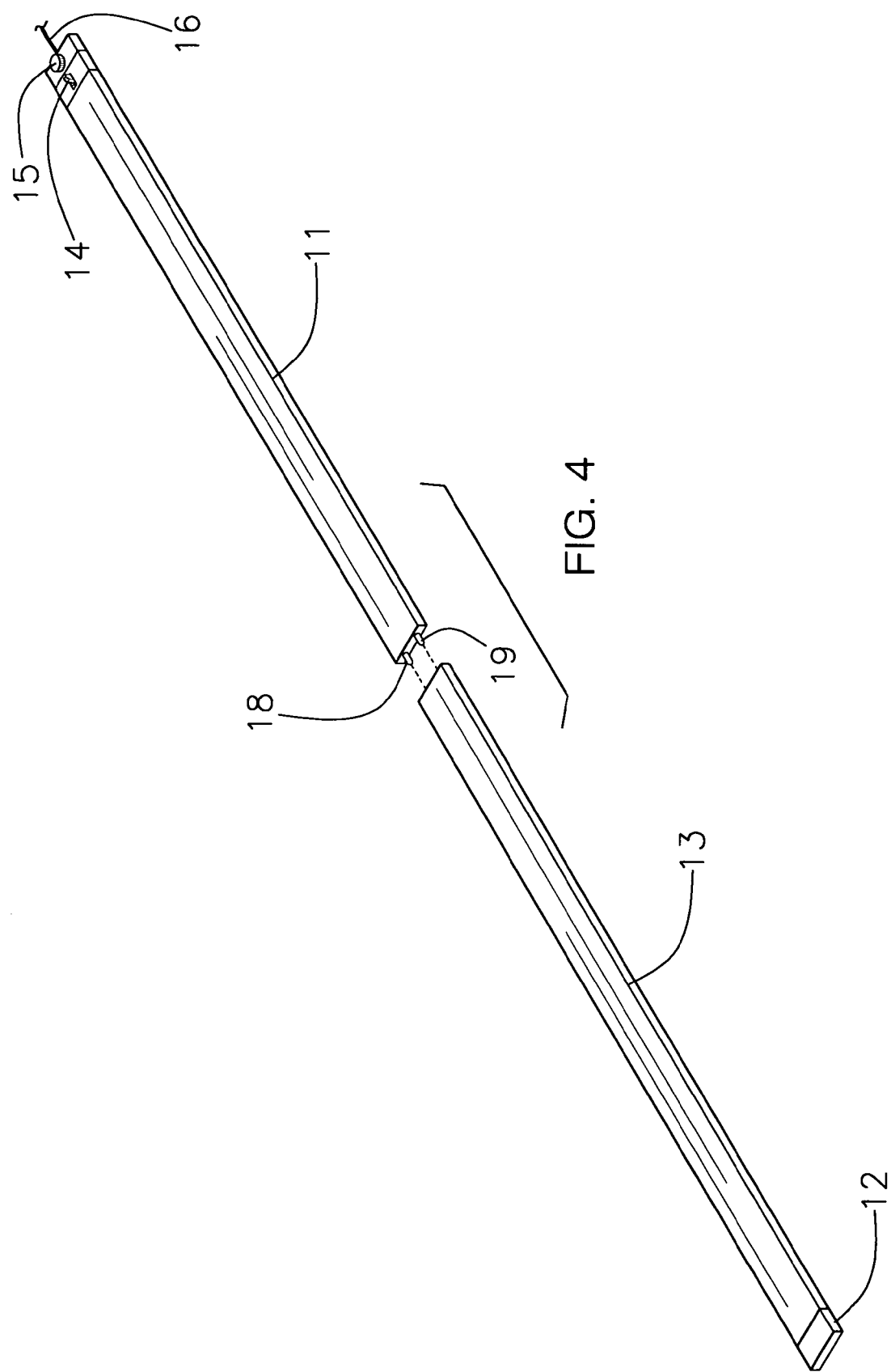
FIG. 4 is a perspective view of the transmitter strip with extension and end cap.

Referring to FIG. 3, flexible strip 11 cross section further defines transmitter wire 34 and transmitter wire 35. Wires 34 and 35 continue throughout the longitudinal distance of strip 11 and strip 13 extension (FIG. 4). Referring to FIG. 4, strip 11 is provided with strip extension 13. Cap 12 fits to extension 13 exactly as on strip 11. Extension 13 plugs into strip 11 as did cap 12 in FIG. 1. Invention 10 is thereby extended. Each strip 11 and strip 13 is about 48 inches in length. Strips 11 and 13 are rubberized and flexible and may be shaped into various configurations (not shown) other than straight positioning shown.

Receiving and emission of animal control device 10 comprises collar unit 22. Unit 22 comprises collar strap 33 for encircling an animal's neck (not shown). Strap 33 further comprises buckle 31 and typical male and female ends, each on an opposite end of strap 33. Receiver/emitter 23 is disposed centrally along strap 33 and fixedly surrounds a relatively small portion thereof. Receiver/emitter 23 internally comprises collar receiver 42 and sound chip 43, joined by receiver/sound chip electrical connect 53 (FIG. 5).

Figure 5:
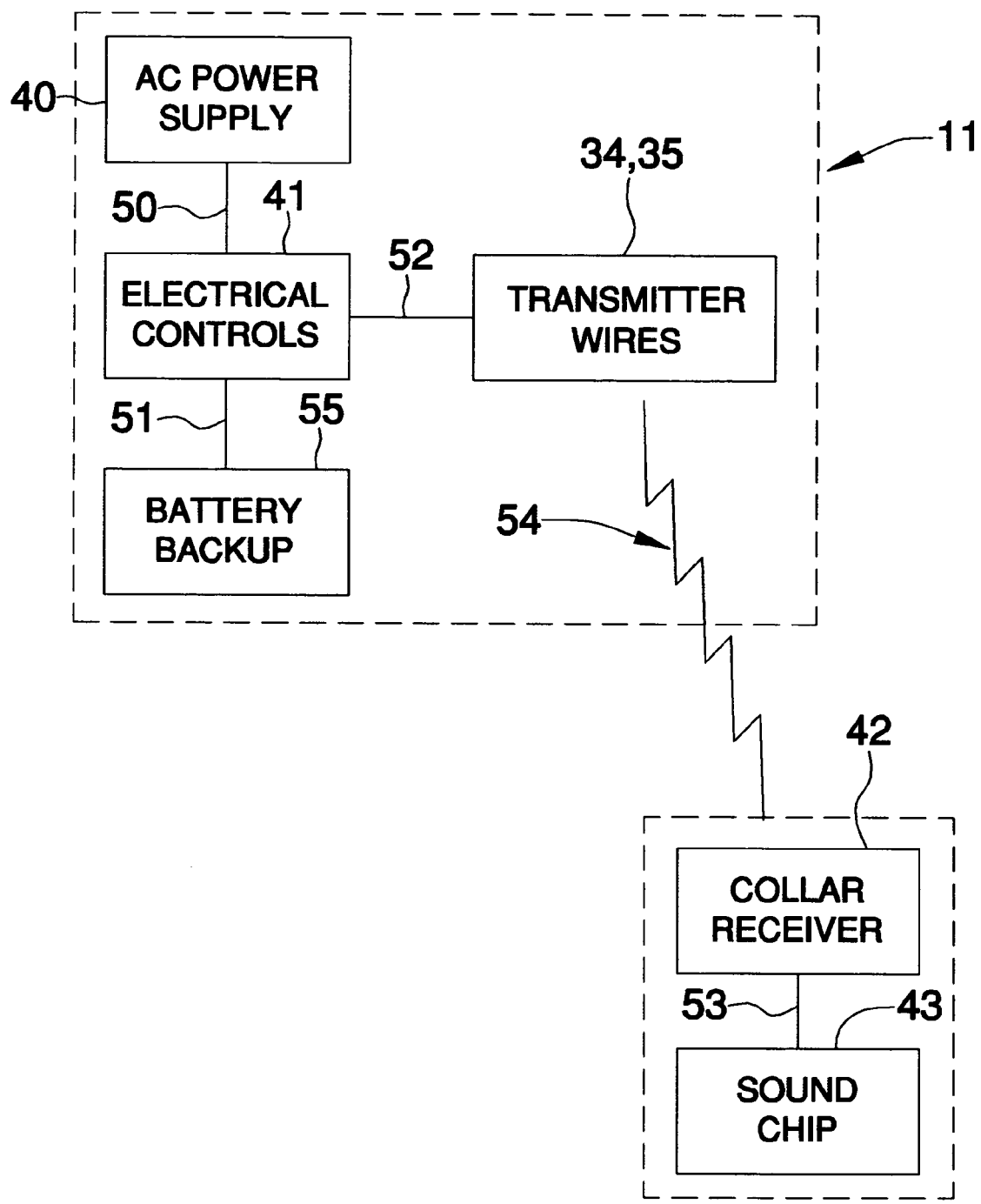
FIG. 5 is a diagram of the electronic components of the animal control device.

Referring to FIG. 5, strip 11 further comprises AC power supply 40, electrical controls 41, battery backup 55 and strip 11 transmitter wire 34 and transmitter wire 35 (FIG. 3). Supply/controls electrical connect 50 connects supply 40 to controls 41. Controls/battery electrical connect 51 connects controls 41 to battery backup 55. Controls/transmitter electrical connect 52 connects controls 41 to wire 34 and wire 35.

In use, strip 11, with or without strip/s 13, is positioned across any area (not shown) from which an animal (not shown) is to be bounded either within or without. The area may prohibit access to a doorway (not shown), a couch (not shown), or any imaginable area distinction (not shown). Invention 10 prohibits entrance or exit of an animal by emitting sound unpleasant to the animal. End cap 12 is installed to terminate strip 11 or strip/s 13. Collar unit 22 is fitted to the animal to be controlled and is secured by typical buckle 31. Buckle adjustment 32 is adjusted such that unit 22 correctly fits.

Available power either from either standard AC via plug 17 or from internal battery backup 55 is utilized. Switch 14 is turned to on position. Frequency control 15 is set at mid level. The animal is then placed within the area to which it is to be contained, or without the area to which it is to be denied admission. If the animal approaches to within proximity of strip 11, airwave transmission 54 from transmitter wires 34 and 35 is received by collar receiver 42 of collar unit 22. Upon receipt of transmission 54 from wires 34 and 35, collar receiver 42 signals sound chip 43, via receiver/sound chip electrical connect 53. If the animal is not repulsed, frequency control 15 is adjusted further until the animal is. A replaceable battery (not shown) is also housed within receiver/emitter 23. The battery powers receiver 42 and sound chip 43. Chip 43 emits sound to alarm the animal and prevent animal access to denied areas. Invention 10 is inoperative when switch 14 is in off position.

With respect to the above description then, it is to be realized that the optimum dimensional relationships for the parts of the animal control device, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An animal control device for controlling area access or egress of animals, the device comprising:
   transmission means comprising a substantially parallelepiped flexible transmitter strip further accessibly comprising on/off control disposed within one end of the strip;
   electrically interconnected receiving and emission means disposed on a removable animal collar, the receiving means receiving airwave signals from the transmitter strip, thereby signaling a warning emission;
   powering means for the transmission means and for the receiving and emission means.

2. The invention in claim 1 wherein the transmitter strip further comprises adjustable frequency control disposed proximally to the on/off control.

3. The invention in claim 2 wherein the transmission means further comprises strip extensions, the extensions removably plugging into the transmitter strip at an end opposite the on/off controls, the strip ends plugging and into each other via male and female ends;

a pluggable end cap removably terminating a strip end.

4. The invention in claim 3 wherein the powering means for the transmission means comprises standard AC outlet voltage, and the powering means for the receiving and emission means comprises a replaceable battery.

5. The invention in claim 4 wherein the powering means for the transmission means further comprises a replaceable battery and standard AC outlet voltage;

internal strip means for automatically selecting between the battery or the AC outlet voltage.

6. The invention in claim 5 wherein the animal control device further comprises more than one collar unit, whereby more than one animal is controlled by the transmission means.

7. The invention in claim 6 wherein the collar unit comprises a collar strap with buckle of typical male and female ends on opposite ends of the strap and a buckle adjustment proximal to one end;

the receiving and emission means comprising a receiver/emitter disposed fixedly and centrally along a small portion of the strap.

8. The invention in claim 7 wherein the emission means comprises a sound chip for warning an animal with sound.

9. The invention in claim 7 wherein the emission means comprises a device for emitting a mild electric shock warning.

10. The invention in claim 7 wherein the emission means comprises a device for delivering vibration.

11. The invention in claim 3 wherein the powering means for the transmission means comprises a replaceable battery.

12. An animal control device for controlling area access or egress of animals, the device comprising:

a substantially parallelepiped flexible transmitter strip further comprising on/off control and frequency control accessibly disposed upwardly within one end of the strip and a male or female plug on an opposite end, the plug for receiving like-shaped strip extensions;

the transmitter strip and strip extensions powered by standard AC outlet voltage and a replaceable battery within the transmitter strip;

internal strip means for automatically selecting between the battery power or the AC outlet voltage power;

a pluggable end cap terminating the last strip end;

a collar unit comprising a receiver/emitter disposed fixedly and centrally along a small portion of a removable, adjustable animal collar strap, the receiver/emitter receiving airwave signals from the transmitter strip, thereby signaling an emission warning an animal, the receiver/emitter powered by a replaceable battery.

13. The invention in claim 12 wherein the transmitter strip and the strip extensions are each about 48 inches long.

14. The invention in claim 13 wherein the emission means comprises a sound chip for warning an animal with sound.

15. The invention in claim 13 wherein the emission means comprises a device for emitting a mild electric shock warning.

16. The invention in claim 13 wherein the emission means comprises a device for delivering warning vibration.

* * * * *